(12) United States Patent
Gandini

(10) Patent No.: US 8,966,744 B2
(45) Date of Patent: Mar. 3, 2015

(54) METHOD FOR MANUFACTURING VEHICLES

(75) Inventor: Marcello Gandini, Turin (IT)

(73) Assignee: Tata Motors Limited, Mumbai, Maharshtra (IN)

( * ) Notice: Subject to any disclaimer, the term of this patent is extended or adjusted under 35 U.S.C. 154(b) by 693 days.

(21) Appl. No.: 13/204,427

(22) Filed: Aug. 5, 2011

(65) Prior Publication Data
US 2012/0126580 A1 May 24, 2012

Related U.S. Application Data

(63) Continuation of application No. PCT/IB2010/050533, filed on Feb. 5, 2009.

(51) Int. Cl.
*H01R 43/00* (2006.01)
*B29C 44/18* (2006.01)
*B62D 29/04* (2006.01)

(52) U.S. Cl.
CPC .............. *B29C 44/18* (2013.01); *B62D 29/041* (2013.01); *B62D 29/046* (2013.01)
USPC .......................................... 29/825; 29/592.1

(58) Field of Classification Search
USPC ................................................ 29/592.1, 825
See application file for complete search history.

(56) References Cited

U.S. PATENT DOCUMENTS

| 6,793,274 B2 * | 9/2004 | Riley et al. ............. 296/187.03 |
| 7,025,409 B2 * | 4/2006 | Riley et al. ............. 296/187.03 |

FOREIGN PATENT DOCUMENTS

| DE | 2128318 | 12/1972 | ............. B62D 21/00 |
| DE | 41 15 971 A1 | 11/1992 | ............. B60R 16/04 |
| JP | 3224848 | 10/1991 | ............. B62D 25/00 |
| WO | WO 99/10204 | 3/1999 | ............. B60R 16/02 |
| WO | WO 2006/015588 A1 | 2/2006 | ............. B60R 16/02 |
| WO | WO 2007/009513 A1 | 1/2007 | ............. B60R 16/02 |
| WO | 2007/056840 A1 * | 5/2007 | |

OTHER PUBLICATIONS

International Search Report and Written Opinion for PCT/IB2010/050533 dated Aug. 9, 2011.

* cited by examiner

*Primary Examiner* — Carl Arbes
(74) *Attorney, Agent, or Firm* — Brinks Gilson & Lione

(57) ABSTRACT

A method of manufacturing vehicles, comprising at least the steps of: providing a first shaped panel made of plastic material; providing a second shaped panel; coupling the first shaped panel to the second shaped panel so as to define a structural element of the vehicle, in which a hollow space is confined between the first shaped panel and the second shaped panel; before or during coupling, arranging conductive tracks in the hollow space, which conductive tracks define at least part of an electric equipment of the vehicle; filling the hollow space with polyurethane.

16 Claims, 5 Drawing Sheets

FIG 3a
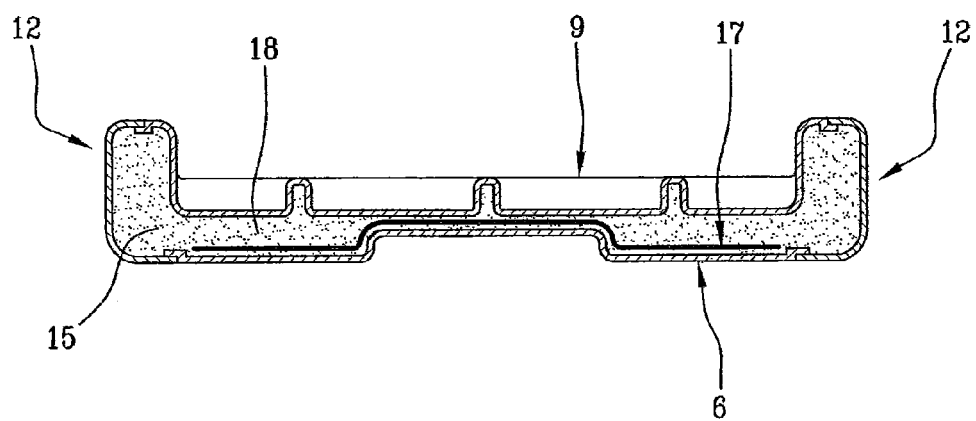
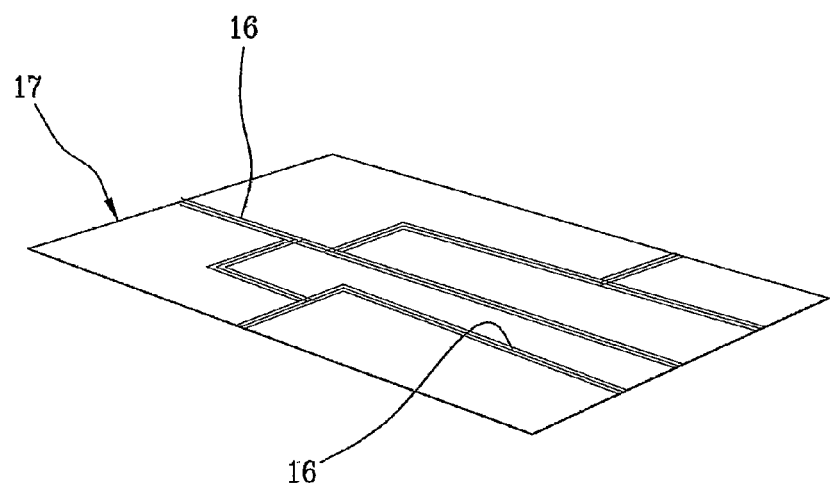
FIG 3b

METHOD FOR MANUFACTURING VEHICLES

RELATED APPLICATION

This application is a continuation of, and claims the benefit of, PCT/IB2010/050533, filed on Feb. 5, 2009, titled "Method for Manufacturing Vehicles and Vehicle Obtained Thereby," the contents of which are incorporated herein by reference.

BACKGROUND

The present invention relates to a method of manufacturing vehicles and to a vehicle obtained by such a method.

It is known that assembling of a vehicle on an assembly line takes place by first providing the chassis and the body, made of aluminum and/or steel, and subsequently individually fitting the other mechanical components such as propelling means and gear change that are connected to each other and to the bearing structure, and other non-structural elements. In addition, simultaneously or subsequently, the electric wire system is laid down, which wire system is designed to mutually connect the different devices (propelling means, control box, battery, lights, inner lights, dashboard instruments, sensors of different kinds, windscreen wipers, navigator, on board computer, etc.) that are to be reached by or from which the electric signals come. The different cables clearly are not gathered in a predetermined region but they extend along the whole vehicle in order to reach said devices. The whole wiring system is laid down either manually or with the aid of robotized arms before installation of the vehicle's inner elements (upholstery and lining, mouldings, seats, etc.), making it pass through hollow spaces delimited by the vehicle body and/or the chassis.

Disadvantageously, these operations involve use of highly qualified manpower and/or complicated and expensive robotized arms.

In addition, the vehicle being manufactured must remain stationary on the assembly line for a very long period of time and, as a result, large spaces are required for placement of said assembly line (sheds), taking into account the number of vehicles that are produced in the time unit.

Therefore, the complexity of installation of the wiring systems affects the planning and production costs, which obviously has repercussions on the selling price of the vehicle to the final customer.

Also known are vehicles that are of simpler structure and made of plastic material. For instance, British Patent No. GB2311966 discloses a motor vehicle consisting of a number of modular plastic panels reinforced with metal elements and filled with foam. This document does not describe or show the placement of the electric wiring system.

In this context, the technical task underlying the present invention is to propose a method of manufacturing vehicles and a vehicle obtained by said method that are able to overcome the above mentioned drawbacks of the known art.

In particular, it is an aim of the present invention to make available a method for vehicle manufacture and a vehicle obtained by such a method that enable the production costs to be reduced, through simplification of the operations required for assembly, so that the assembly times are correspondingly reduced, with particular reference to installation of the electrical equipment.

The technical task mentioned and the aims specified are substantially achieved by a method of manufacturing vehicles and a vehicle obtained by such a method, comprising the technical features set out in one or more of the appended claims.

BRIEF DESCRIPTION OF THE DRAWINGS

FIG. 3*a* is a cross-section of the first structural element in FIG. 2.

FIG. 3*b* shows an element fitted in the first structural element seen in FIG. 2.

DETAILED DESCRIPTION OF THE DRAWINGS AND THE PRESENTLY PREFERRED EMBODIMENTS

Figure 1:
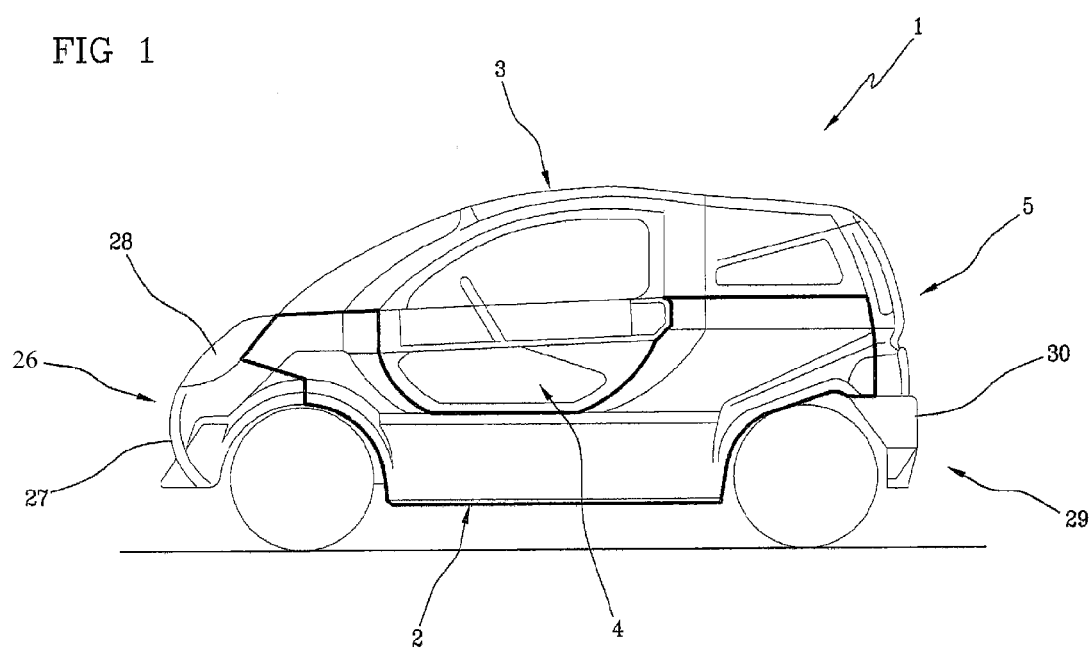
FIG. 1 is an elevation side view of a vehicle manufactured in accordance with the present invention.

With reference to the accompanying figures, a vehicle 1, manufactured in accordance with the present invention, is shown. In the non-limiting embodiment shown, vehicle 1 is a compact car comprising a chassis 2 and provided with an interior compartment closed by a roof 3, access to which occurs through two side doors 4 (only one of which is shown in FIG. 1) and a hatchback door 5.

Figure 2:
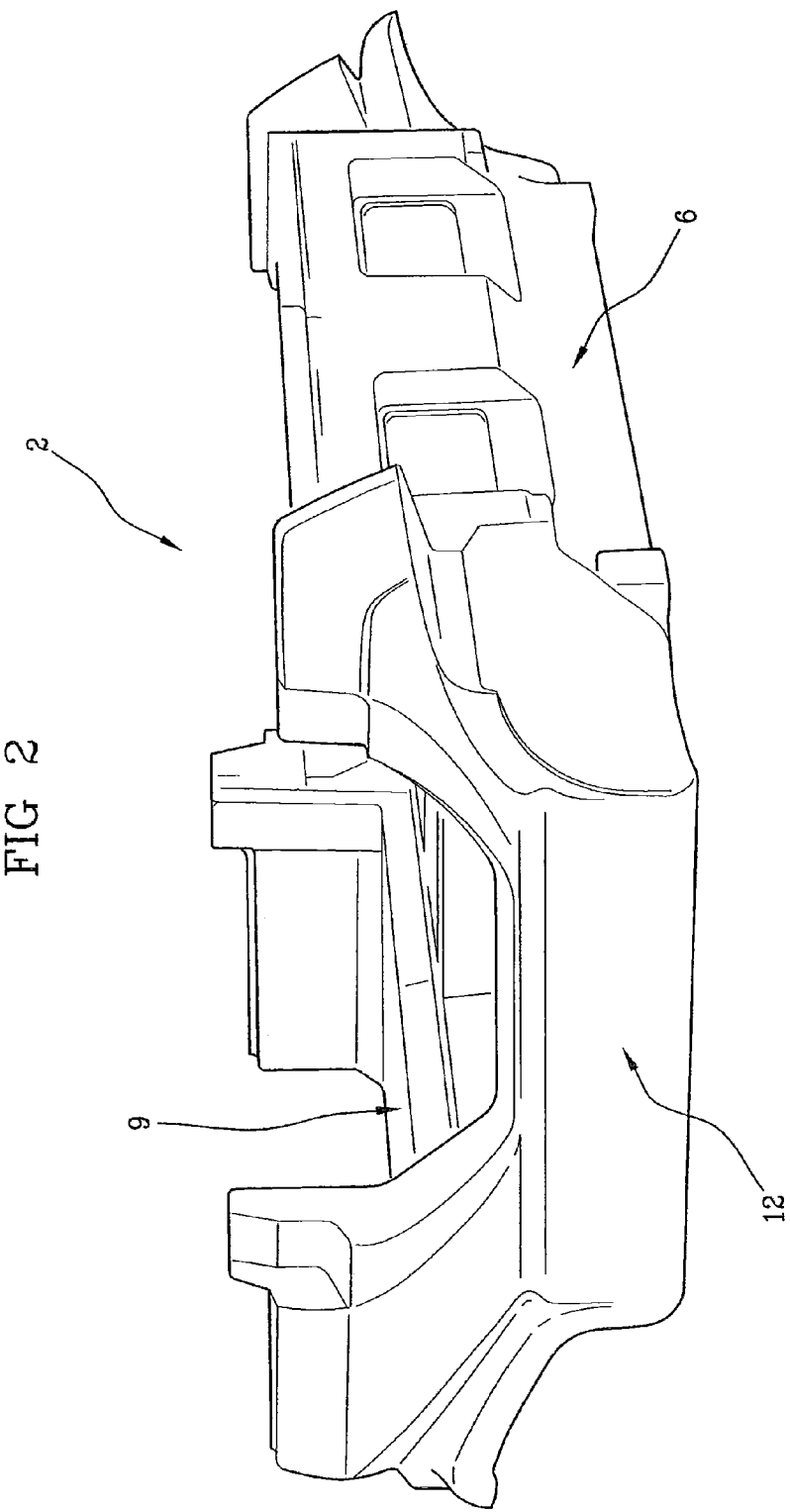
FIG. 2 shows a first structural element of the vehicle seen in FIG. 1, manufactured according to the present invention.

With reference to FIG. 2, the chassis 2 has a box-shaped structure and its conformation is like that of a tub or vat.

Figure 3:
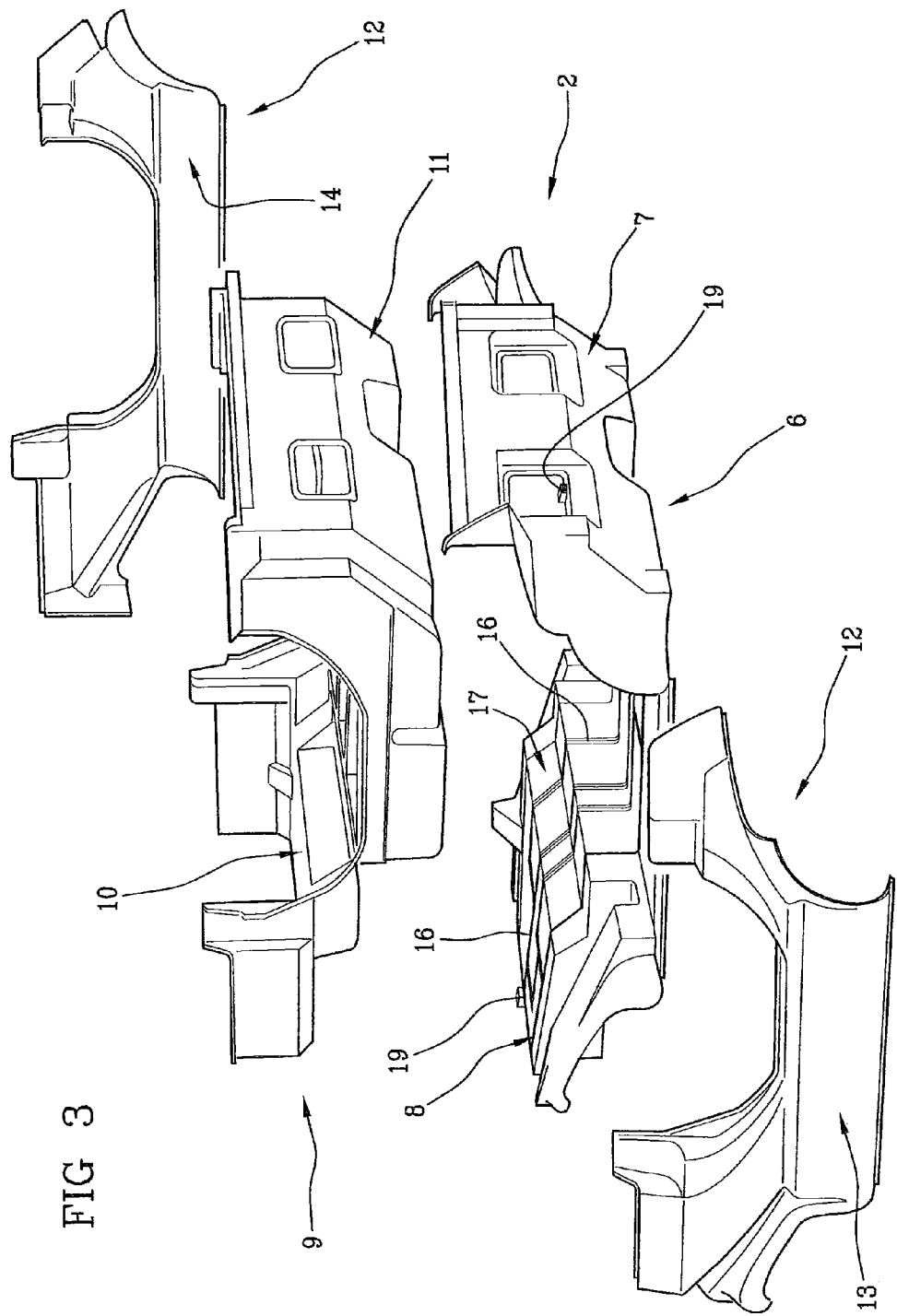
FIG. 3 shows an assembly step of the first structural element seen in FIG. 2 being part of the method in accordance with the present invention.

In particular (see FIG. 3), the chassis 2 comprises a first panel 6 that is suitably shaped and has a first face 7 designed to define a lower surface of the chassis 2, i.e. the outer bottom of vehicle 1, and a second face 8 opposite to the first one 7. The first panel 6 too, taken separately, has the shape of a tub the concavity of which is defined by the second face 8.

The chassis 2 further comprises a second panel 9 suitably shaped and having a first face designed to define an upper surface of the chassis 2, i.e. the inner bottom of vehicle 1, and a second face 11 opposite to the first one 10. The second panel 9 too, taken separately, has the shape of a tub the concavity of which is defined by the first face 10.

The chassis 2 also comprises two sides 12, each defined by a third shaped panel having a first face 13 that is substantially convex and designed to define a side surface of the chassis 2, i.e. part of the flank of vehicle 1. A substantially concave second face 14 of each of the third panels 12, once the chassis 2 has been assembled, remains at the inside and faces the first and second panels 6, 9.

Said panels 6, 9, 12 are preferably made of a composite material, preferably plastic material, such as an ABS and polycarbonate blend, possibly reinforced with glass fibres. Said panels 6, 9, 12 can be manufactured by injection moulding or thermoforming, for example.

Once manufactured, the first and second panels 6, 9 are coupled by moving the second face 8 of the first panel 6 close to the second face 11 of the second panel 9, which faces therefore remain at the inside, and joining the two panels 6, 9, by gluing for example. Due to the shape of the two panels 6, 9, once said panels are coupled and joined together, at least one hollow space remains confined between them (FIG. 3*a*).

In addition, this hollow space is laterally closed by the third panels 12 that are glued to the first and second panels 6, 9. The chassis 2 therefore exhibits a hollow box-shaped structure.

Advantageously, before coupling said panels 6, 9, 12, conductive tracks 16 are laid on the second face 8 of the first panel 6 and/or the second face 11 of the second panel 9 or also the second face 14 of each of the third panels 12, which conductive tracks at least partly define the electrical equipment of vehicle 1.

In a preferred embodiment herein illustrated, the conductive tracks 16 are thin strips of metal obtained on one or more sheets 17 of insulating material (FIG. 3b), which sheets 17 are applied to the above mentioned faces 8, 11, 14 through gluing for example, or they are merely laid down on the second face 8 of the first panel 6. Possibly, these sheets before or after application are covered with other insulating sheets or coated with a layer of insulating paint.

In accordance with alternative embodiments not shown, the conductive tracks 16 are thin strips of metal and/or electric cables directly applied onto one or more of the above mentioned faces 8, 11, 14 and possibly covered with insulating sheets or coated with a layer of insulating paint.

If the conductive tracks 16 are disposed on said sheets 17, insertion of the sheets 17 themselves between the panels and mutual closure of same can also take place simultaneously.

The hollow space is subsequently filled with foamed material 18 such as polyurethane, having a triple function, i.e.: a) making the structure stronger and stiffer, b) soundproofing the car, and c) electrically insulating the conductive tracks 16 also without the presence of said sheets or the insulating paints.

The conductive tracks 16 extend within the hollow space based on the specific construction requirements, so as to enable connections with the different electrical devices of vehicle 1. To this aim, the end portions of the conductive tracks 16 are preferably connected to connectors 19 mounted on the chassis 2 and external to the hollow space 15, so as to enable easy and quick connection with other connectors carried by and/or connected to said electrical devices. Said connectors 19 too are installed on panels 6, 9, 12 preferably before assembly of same.

For instance, a connector 19 is mounted in the region of a rear portion of the chassis 2 to enable connection with the electronic control box or the battery. The conductive track or tracks 16 associated with such a connector 19 have opposite end portions connected to one or more connectors 19 provided, for example, for being coupled to user bases (lights, inner lights, etc.) sensors (door-closure sensors, parking sensors, etc.), actuators (motor for windscreen wipers, door locking device, power windows etc.).

Figure 4:
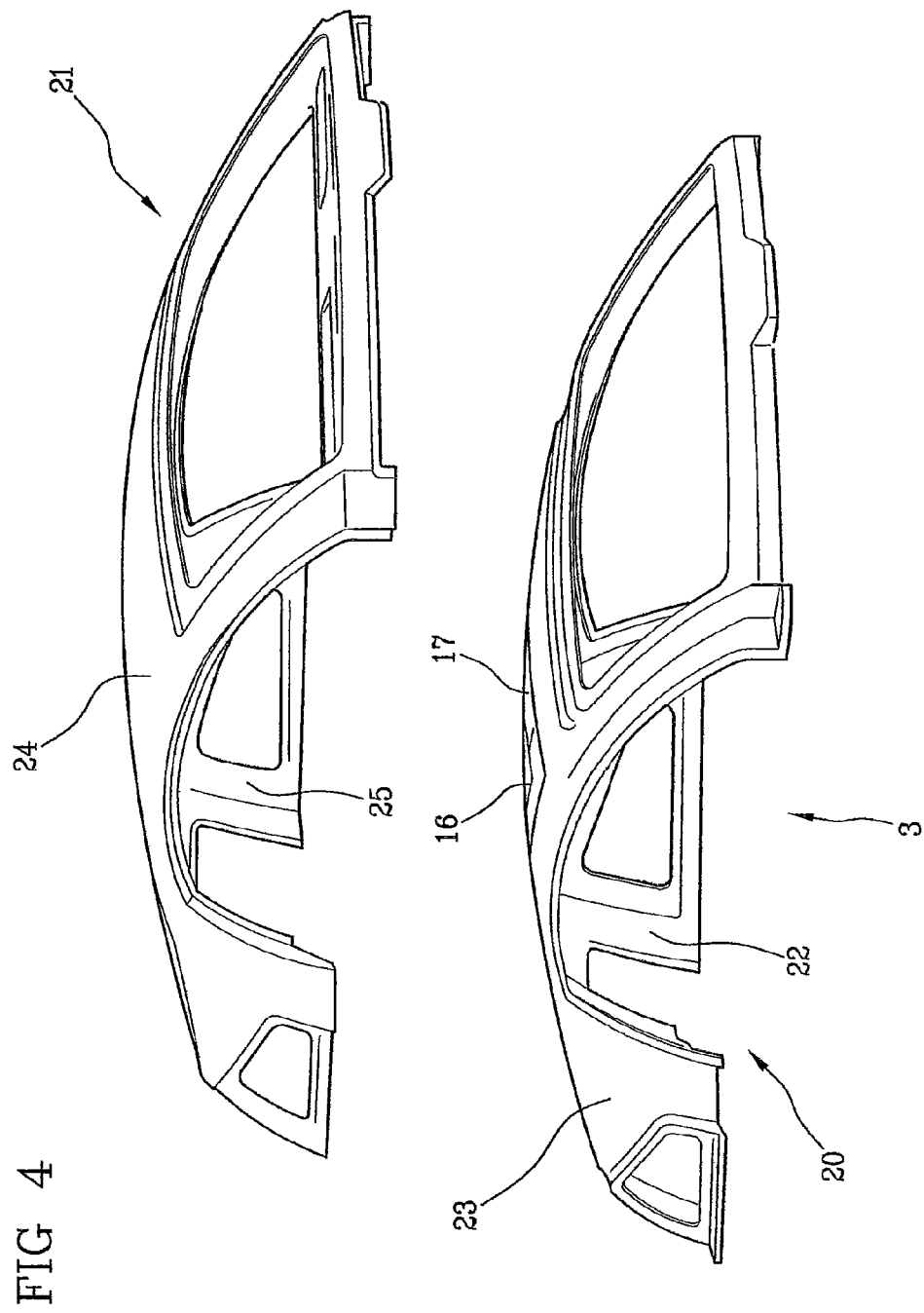
FIG. 4 shows an assembly step concerning a further structural element being part of the method according to the present invention.

Preferably, in the same manner as for construction of the chassis 2, the roof 3 shown in FIG. 4 is formed with a pair of panels 20, 21.

In particular, roof 3 comprises a first panel which is suitably shaped and has a first face 22 designed to define an inner surface of the interior compartment and a second face 23 opposite to the first one 22. The roof 3 further comprises a second panel 21 that is suitably shaped and has a first face 24 designed to define an upper surface of roof 3 and a second face opposite to the first one 24. The materials used for the above mentioned panels can be the same as those used for the chassis 2. Once made, the first and second panels 20, 21 are coupled by moving the second face 23 of the first panel close to the second face of the second panel 21, which faces therefore remain at the inside, and joining the two panels 20, 21 together, by gluing for example. Due to the shape of the two panels 20, 21, once said panels have been coupled and joined, at least one hollow space (not shown) remains confined between them. At the inside of this hollow space too, one or more conductive tracks 16 are advantageously laid down, for energising the roof lamps, for example. In the illustrated embodiment, placed on the second face 23 of the first panel is a sheet 17 provided with a conductive track 16 terminating at the roof lamp (not shown). Conductive material passes through the thickness of the first panel and reaches the contacts of the lamp or lamps, preferably by means of connectors. The conductive tracks 16 preferably are of the type already described with reference to the chassis 2 (strips applied onto sheets, or directly onto the panel, cables that are insulated or not using paint or insulating sheets). Also the hollow space of the roof 3 is subsequently filled with foamed material 18, such as polyurethane.

As viewed from FIG. 1, vehicle 1 further comprises a front unit 26 in turn including the mechanical members of the forecarriage (wheels, brakes, steering wheel, suspensions, part of the transmission, etc.), a front bumper 27, the front lights 28.

Vehicle 1 further comprises a rear unit 29 in turn including the propelling means, battery (one or more batteries, if it is an electrical propelling means), mechanical members of the rear axle (wheels, brakes, suspensions, part of the transmission, etc.), a rear bumper 30.

The two mentioned units 26, 29 are mounted separately from the chassis 2 and roof 3. During assembly of vehicle 1, the chassis 2 and roof 3, already mutually assembled, are mounted to the two units 26, 29 and locked.

In addition, the electrical connections are carried out by joining the connectors 19 positioned on the chassis 2 with the connectors 19 mounted on the front unit 26 and the rear unit 29 and connected to the above mentioned electrical devices being part of said units.

Preferably, the bumpers 27, too are each made up of two shaped and coupled plastic panels that confine a hollow space filled with foamed material. Possibly, conductive tracks can also be arranged at the inside of bumpers 27, 30, which tracks are connected to parking sensors mounted in said bumpers, for example.

Likewise, the side doors 4 and hatchback door too are formed from shaped and coupled plastic panels confining a hollow space filled with foamed material. The conductive tracks are also disposed at the inside of the side doors 4 and hatchback door 5, said tracks being connected, for example, to the motor of the power windows and/or the sensors for door locking and/or the door locking device and/or the motor of the windscreen wiper mounted on the hatchback door 5. These conductive tracks are in addition connected to connectors mounted on the doors 4 and hatchback door 5, externally of the hollow space, to enable easy connection with the connectors placed on the chassis 2.

Therefore the chassis 2, roof 3, doors 4, hatchback door 5, bumpers 27, are all structural elements made up of an outer shell filled with foamed material.

In accordance with alternative embodiments not shown, the mentioned structural elements are defined by box-shaped structures consisting of a single block (not by coupled panels), preferably made of plastic material, having said hollow space filled with foamed material and containing the above described conductive tracks, preferably consisting of metal strips.

The present invention reaches the intended purposes and achieves important advantages.

The process in accordance with the present invention first of all allows the production costs to be reduced by simplifying the assembly operations and consequently the time required for making them.

In fact, placement of at least part of the electrical equipment in one or more structural box-shaped elements of the vehicle eliminates the necessity to be subsequently obliged to cover the cables with covering elements and mouldings. As a result, all operations are simplified and the required time for assembly is reduced. In addition, the conductive tracks are protected by the outer shell and the polyurethane material.

Moreover, construction of the structural elements through assembly of the individual panels, preferably of plastic material, is of simple accomplishment and allows the production costs and times to be reduced.

The greatest advantages can be reached if it is the chassis to be made in this manner, because most of the wiring system must necessarily pass therethrough.

By first laying down the conductive tracks on the panels and then joining said panels together, there is an important saving in the time required for installation of the electrical equipment.

The connectors located externally of the shell enable the electrical connections between the different structural elements (chassis, roof, front and rear units, doors, hatchback door, etc.) to be carried out in a very simple and quick manner.

If the conductive tracks are metal strips, laying of them is simple and of easy understanding for the operator. Simplicity is maximised in case of strips obtained before the final assembly on said sheets (in the form of a printed circuit), because it is then sufficient to lay down the sheet or sheets on the panels.

Insulation of the tracks (by painting, insulating sheets or the polyurethane material alone) allows use of cables provided with suitable covering sheaths to be avoided. Since in a preferred embodiment, the panels are made of plastic material (and therefore an electrically insulating material), the conductive tracks can be directly laid down on said panels.

The resulting vehicle is simple and cheap but it works well, is practical and of quality.

While preferred embodiments of the invention have been described, it should be understood that the invention is not so limited, and modifications may be made without departing from the invention. The scope of the invention is defined by the appended claims, and all methods that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:

1. A method of manufacturing vehicles, comprising at least the steps of:
   i) preparing a structural element of a vehicle internally provided with a hollow space by performing the steps of
      a) providing a first shaped panel;
      b) providing a second shaped panel; and
      c) coupling the first shaped panel to the second shaped panel so as to define the structural element of the vehicle, wherein confined between the first shaped panel and the second shaped panel, is the hollow space;
   ii) prior to coupling the first shaped panel to the second shaped panel, arranging at least one conductive track on one of the first shaped panel and the second shaped panel on an inner face delimiting the hollow space, where the at least one conductive track define at least part of an electrical equipment of the vehicle; and
   iii) filling said hollow space with a foamed material.

2. The method as claimed in claim 1, wherein the structural element is a lower chassis of the vehicle.

3. The method as claimed in claim 1, wherein the structural element is a roof of the vehicle.

4. The method as claimed in claim 1, wherein the structural element is a door.

5. The method as claimed in claim 1, wherein the structural element is a bumper.

6. The method as claimed in claim 1, wherein the step of arranging the at least one conductive track in the hollow space is carried out by first laying said at least one conductive track on an inner face of the first shaped panel and subsequently coupling the first shaped panel to the second shaped panel.

7. The method as claimed in claim 1, wherein the step of arranging the conductive tracks in the hollow space is carried out by first laying said at least one conductive track on an inner face of the second shaped panel and subsequently coupling the first shaped panel to the second shaped panel.

8. The method as claimed in claim 1, further comprising the step of installing connectors facing outwards and electrically connected to said at least one conductive track on one of the first shaped panel and the second shaped panel of said structural element prior to coupling the first shaped panel and the second shaped panel.

9. The method as claimed in claim 1, wherein said at least one conductive track is an electric cable.

10. The method as claimed in claim 1, wherein said at least one conductive track is a metal strip.

11. The method as claimed in claim 1, wherein said at least one conductive track is laid down on at least one sheet and the step of arranging the at least one conductive track in the hollow space is carried out by laying said sheet in the hollow space.

12. The method as claimed in claim 1, comprising the step of painting said at least one conductive track so as to insulate them.

13. The method as claimed in claim 1, comprising the step of applying an insulating sheet on at least one conductive track.

14. The method as claimed in claim 1, wherein the foamed material is an electrical insulating material, preferably polyurethane.

15. The method as claimed in claim 1, wherein the structural element is made of plastic material.

16. The method as claimed in claim 1, wherein the structural element is a first structural element with a first conductive tracks, the method further comprising the steps of:
   iv) installing first connectors facing outwards and electrically connected to said first conductive tracks on one of the first shaped panel and the second shaped panel of said first structural element;
   v) preparing a second structural element having a second hollow space and a second conductive track in the hollow space with second connectors in predetermined positions facing outwards and electrically connected to said second conductive tracks, the second connectors being arranged to connect with the first connectors;
   vi) assembling the first structural element with the second structural element; and
   vii) connecting the first connectors with the second connectors.

* * * * *